(12) United States Patent
Li et al.

(10) Patent No.: US 10,976,770 B2
(45) Date of Patent: Apr. 13, 2021

(54) BACKLIGHT MODULE AND DISPLAY DEVICE

(71) Applicants: Beijing BOE Optoelectronics Technology Co., Ltd., Beijing (CN); BOE Technology Group Co., Ltd., Beijing (CN)

(72) Inventors: Pei Li, Beijing (CN); Yiping Ruan, Beijing (CN); Jinpeng Li, Beijing (CN); Zhihui Zeng, Beijing (CN); Zhiyong Chen, Beijing (CN); Xiangyu Ji, Beijing (CN); Zongying Shu, Beijing (CN); Enkai Dong, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 36 days.

(21) Appl. No.: 16/332,270

(22) PCT Filed: Sep. 6, 2018

(86) PCT No.: PCT/CN2018/104403
§ 371 (c)(1),
(2) Date: Mar. 11, 2019

(87) PCT Pub. No.: WO2019/134382
PCT Pub. Date: Jul. 11, 2019

(65) Prior Publication Data
US 2020/0218308 A1   Jul. 9, 2020

(30) Foreign Application Priority Data
Jan. 2, 2018   (CN) .......................... 201810002982.6

(51) Int. Cl.
*G06F 1/16* (2006.01)
*F21V 33/00* (2006.01)
*F21W 111/10* (2006.01)

(52) U.S. Cl.
CPC ........ *G06F 1/1607* (2013.01); *F21V 33/0052* (2013.01); *G06F 1/1626* (2013.01); *F21W 2111/10* (2013.01)

(58) Field of Classification Search
CPC .. G06F 1/1607; G06F 1/1626; F21V 33/0052; F21W 2111/10
See application file for complete search history.

(56) References Cited

U.S. PATENT DOCUMENTS

2010/0124003 A1*  5/2010  Liu ..................... H04M 1/0237
                                                       361/679.01
2011/0148784 A1*  6/2011  Lee ....................... G06F 1/1616
                                                       345/173

(Continued)

FOREIGN PATENT DOCUMENTS

CN    102865523 A    1/2013
CN    102868868 A    1/2013

(Continued)

OTHER PUBLICATIONS

International Search Report and Written Opinion (including English translation of International Search Report and Box V of the Written Opinion) for International Application No. PCT/2018/104403, dated Dec. 12, 2018, 13 pages.

(Continued)

*Primary Examiner* — Donald L Raleigh
(74) *Attorney, Agent, or Firm* — Westman, Champlin & Koehler, P.A.

(57) ABSTRACT

The present disclosure relates to a backlight module and a display device. The backlight module includes a connection portion to be connected to a middle casing of a display (Continued)

device or a side frame of a display device, and the connection portion is located on a side of the backlight module adjacent to the middle casing of the display device.

14 Claims, 5 Drawing Sheets

(56) References Cited

U.S. PATENT DOCUMENTS

| | | | |
|---|---|---|---|
| 2012/0039091 A1* | 2/2012 | Lee | G06F 1/1637 |
| | | | 362/633 |
| 2013/0194781 A1* | 8/2013 | Kim | H04M 1/0266 |
| | | | 362/97.1 |
| 2014/0192288 A1* | 7/2014 | Li | G02B 6/0091 |
| | | | 349/58 |
| 2014/0192292 A1* | 7/2014 | Li | G02B 6/0088 |
| | | | 349/65 |
| 2015/0029444 A1 | 1/2015 | Li | |
| 2015/0124191 A1 | 5/2015 | Yu | |
| 2016/0178957 A1* | 6/2016 | Nakanishi | G02F 1/133308 |
| | | | 349/58 |
| 2017/0048989 A1* | 2/2017 | Chao | G06F 1/1601 |
| 2018/0302994 A1* | 10/2018 | Fordham | G06F 1/1626 |
| 2019/0129090 A1 | 5/2019 | Ying et al. | |

FOREIGN PATENT DOCUMENTS

| | | |
|---|---|---|
| CN | 103162247 A | 6/2013 |
| CN | 203350566 U | 12/2013 |
| CN | 103543543 A | 1/2014 |
| CN | 103995384 A | 8/2014 |
| CN | 204807865 U | 11/2015 |
| CN | 106707592 A | 5/2017 |
| CN | 206164624 U | 5/2017 |
| CN | 206601550 U | 10/2017 |
| CN | 108105725 A | 6/2018 |

OTHER PUBLICATIONS

First Office Action, including Search Report, for Chinese Patent Application No. 201810002982.6, dated Mar. 21, 2019, 12 pages.
Second Office Action, including Search Report, for Chinese Patent Application No. 201810002982.6, dated Mar. 23, 2020, 12 pages.

* cited by examiner

US 10,976,770 B2

1
BACKLIGHT MODULE AND DISPLAY DEVICE

CROSS-REFERENCE TO RELATED APPLICATION

The present application is the national phase of PCT application PCT/CN2018/104403 filed on Sep. 6, 2018, and claims the benefit of Chinese Patent Application No. 201810002982.6 filed on Jan. 2, 2018 in the State Intellectual Property Office of China, the whole disclosure of which is incorporated herein by reference.

TECHNICAL FIELD

The present disclosure relates to a field of display technologies, and in particular, to a backlight module and a display device.

BACKGROUND

With the development of science and technology, a narrow frame design of mobile terminals, such as a mobile phone, has prevailed over the current design trend. A mobile phone of the related art includes a display module, a cover glass fixed to a front side of the display module, and a side frame that is bonded to the cover glass with glue dispensing. In order to ensure a bonding strength between the side frame and the cover glass, a width l of the dispensed glue is usually not less than 0.8 mm. In order to avoid assembly interference between the display module and the side frame, a gap c between the display module and the side frame should be at least 0.3 mm. In this regard, in the related art, a distance between the display module and the edge of the cover glass is at least above 1.1 mm, which results in a relatively large size of the frame of the mobile phone, thereby affecting the screen-to-body ratio of the mobile phone.

SUMMARY

According to an aspect of the present disclosure, there is provided a backlight module, comprising a connection portion to be connected to a middle casing of a display device or a side frame of a display device, and the connection portion is located on a side of the backlight module adjacent to the middle casing of the display device.

In an embodiment of the present disclosure, the orthographic projection of the connection portion on a surface of one side of the display device on which the display panel is disposed falls within an effective display range.

In an embodiment of the present disclosure, the backlight module comprises a plurality of connection portions which are respectively disposed on one or more edges of four edges on the side of the backlight module adjacent to the middle casing of the display device.

In an embodiment of the present disclosure, the backlight module further comprises a backing plate, on which the connection portion is disposed.

In an embodiment of the present disclosure, the backlight module further comprises a plastic frame, on which the connection portion is disposed.

In an embodiment of the present disclosure, the connection portion and the back plate are of a unitary structure.

In an embodiment of the present disclosure, the connection portion and the plastic frame are of a unitary structure.

In an embodiment of the present disclosure, the middle casing is connected to the side frame.

2

According to another aspect of the present disclosure, there is provided a display device, comprising a side frame and a middle casing in the side frame; and the backlight module above mentioned, wherein the backlight module is connected to the middle casing or the side frame via the connection portion.

In an embodiment of the present disclosure, the backlight module is connected to the middle casing via the connection portion, and a first snap button is disposed on one end of the middle casing close to the side frame; the connection portion is interposed between the side frame and the end of the middle casing and comprises a first snap hole to be fitted with the first snap button.

In an embodiment of the present disclosure, the backlight module is connected to the side frame via the connection portion, and a second snap button is disposed on a side of the side frame close to the end of the middle casing; the connection portion is interposed between the side frame and the end of the middle casing and comprises a second snap hole to be fitted with the second snap button.

In an embodiment of the present disclosure, the backlight module is connected to the middle casing via the connection portion, and a first snap groove is disposed on one end of the middle casing close to the side frame; the connection portion is interposed between the side frame and the end of the middle casing and comprises a first snap hook to be fitted with the first snap groove.

In an embodiment of the present disclosure, the backlight module is connected to the side frame via the connection portion, and a second snap groove is disposed on a side of the side frame close to the end of the middle casing; the connection portion is interposed between the side frame and the end of the middle casing and comprises a second snap hook to be fitted with the second snap groove.

In an embodiment of the present disclosure, the backlight module is connected to the middle casing via the connection portion, and a first magnetic adsorption portion is disposed on a side of the middle casing close to the backlight module; the connection portion comprises a first magnet to be attracted to the first magnetic adsorption portion.

In an embodiment of the present disclosure, the backlight module is connected to the side frame via the connection portion, and a second magnetic adsorption portion is disposed on a side of the side frame close to the end of the middle casing; the connection portion is interposed between the side frame and the end of the middle casing and comprises a second magnet to be magnetically attracted to the second magnetic adsorption portion.

In an embodiment of the present disclosure, the side frame includes a fixing plate portion extending to a side of the middle casing away from the backlight module, and the fixing plate portion is connected to the middle casing via a fastener.

In an embodiment of the present disclosure, the display device further comprises a display panel on a side of the backlight module away from the middle casing, and a protective cover plate which is disposed on a side of the display panel away from the backlight module and is connected to the display panel.

In an embodiment of the present disclosure, the protective cover plate extends to an inner side wall of the side frame.

In an embodiment of the present disclosure, the middle casing is connected to the side frame.

DETAILED DESCRIPTION OF EMBODIMENTS

In order to reduce the size of the frame of the display device and increase the screen-to-body ratio of the display device, the embodiment of the present disclosure provides a backlight module and a display device. The present disclosure will be further described in detail in the following embodiments so as to clarify the objects, technical solutions and advantages of the present disclosure.

Figure 1:
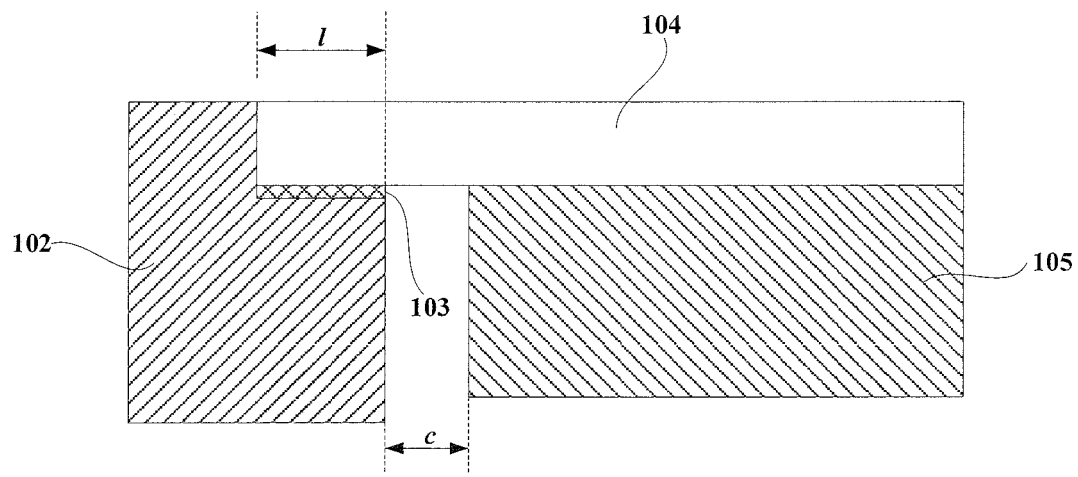
FIG. 1 is a schematic cross-sectional view of a mobile phone of the related art.

FIG. 1 shows a cross-sectional structure of a mobile phone of the related art. The mobile phone of the related art includes: a display module 105, a cover glass 104 fixed to a front side of the display module 105, and a side frame 102 bonded to the cover glass 104 via the dispensed glue 103. In order to ensure a bonding strength between the side frame 102 and the cover glass 104, a width l of the dispensed glue 103 is usually not less than 0.8 mm. In order to avoid assembly interference between the display module 105 and the side frame 102, a gap c between the display module 105 and the side frame 102 should be at least 0.3 mm. In this regard, the distance between the display module 105 and the edge of the cover glass 104 is at least above 1.1 mm, which results in a relatively large size of the frame of the mobile phone, thereby affecting the screen-to-body ratio of the mobile phone.

Figure 2:
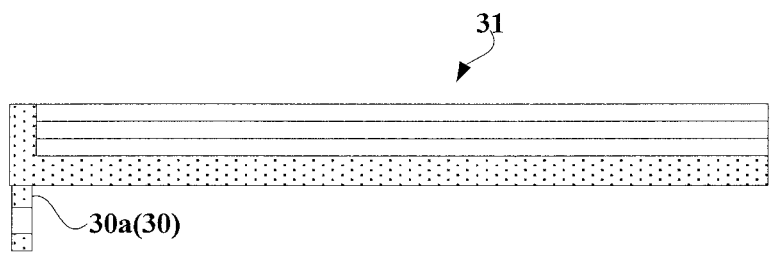
FIG. 2 is a schematic cross-sectional view of a backlight module according to an embodiment of the present disclosure.
Figure 3:
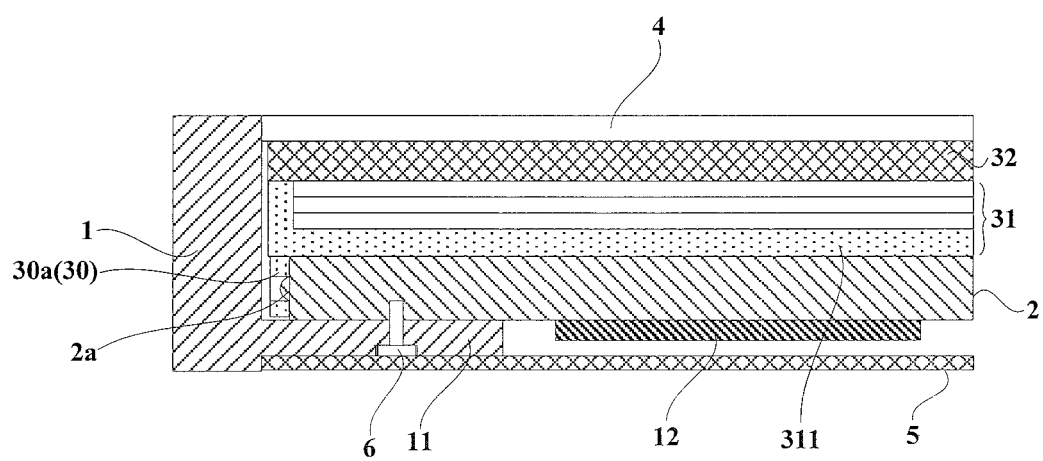
FIG. 3 is a schematic cross-sectional view of a display device according to an embodiment of the present disclosure, in which the middle casing and the connection portion are connected via the first snap button and the first snap hole.

As shown in FIG. 2 and FIG. 3, the backlight module 31 of the embodiment of the present disclosure comprises a connection portion 30 to be connected to a middle casing 2 and/or a side frame 1 of the display device, and the connection portion 30 is located on a side of the backlight module 31 adjacent to the middle casing 2 of the display device.

The structure of the backlight module generally includes a back plate 311 as well as a reflective sheet, a light guide plate, an optical film, and a light source on a back side of the back plate 311. The backlight module 31 may further include a plastic frame connected to the back plate 311. In some forms of backlight modules, a design having no back plate may also be used, and the plastic frame provides installation and support for internal components. There is no limitation to the specific arrangement of the connection portion 30 on the backlight module 31, and the connection portion 30 may be disposed on the back plate 311 or the plastic frame of the backlight module 31.

In a condition that the connection portion 30 is disposed on the back plate 311, the connection portion 30 and the back plate 311 may be of a unitary structure, which may be integrally formed at the time of fabrication, thereby simplifying the process. In addition, in a condition that the connection portion is disposed on the plastic frame, the connection portion and the plastic frame may also be of a unitary structure, thereby being integrally formed at the time of fabrication, thereby simplifying the process.

In the technical solution of the above-mentioned embodiments of the present disclosure, the backlight module 31 may be connected to the middle casing 2 and/or the side frame 1 of the display device via the connection portion 30. Because the connection portion 30 is located on a side of the backlight module 31 adjacent to the middle casing of the display device and it does not occupy the area of the frame. Therefore, the frame of the display device including such a backlight module 31 has a small frame size and a relatively large screen-to-body ratio.

As shown in FIG. 3 to FIG. 10, the display device provided by the embodiment of the present disclosure includes a side frame 1, as well as a middle casing 2 and the backlight module 31 of the foregoing embodiment which are disposed in the side frame 1 sequentially. The middle casing 2 is connected to the side frame 1 and the backlight module 31 is connected to the middle casing 2 or the side frame 1 via the connection portion 30.

In the embodiment of the present disclosure, there is no limitation to the specific product type of the display device, it could be, for example, a mobile phone, a tablet computer, a smart wearable device, or the like.

Referring to the embodiment shown in FIG. 3, in addition to the above components, the display device further includes a display panel 32 on a side of the backlight module 31 away from the middle casing 2, a protective cover plate 4 on a side of the display panel 32 away from the backlight module 31, an appearance rear casing 5 on a side of the middle casing 2 away from the backlight module 31, as well as a main board 12, a camera module, an antenna module and the like which are disposed between the appearance rear casing 5 and the middle casing 2. The middle casing 2 and the side frame 1 serve to support, limit and fix these components.

In the technical solution of the above embodiment of the present disclosure, the backlight module 31 is provided with the connection portion 30 on a side close to the middle casing 2, and the backlight module 31 is connected to the middle casing 2 or the side frame 1 via the connection portion 30. As may be seen from FIG. 3, the orthographic projection of the connection portion 30 on the front side of the display device, that is, on a surface on a side of the display device on which the display panel 32 is disposed, falls within an effective display range of the display device. Therefore, the connection portion 30 does not need to occupy the area of the frame and the frame size of the display device may be designed to be small, and the screen-to-body ratio of the display device is relatively high. Compared with the prior art, the technical solutions provided by the foregoing embodiments of the present disclosure effectively improve the appearance and display quality of the product, and provide a better user experience.

In the embodiment of the present disclosure, the specific number and arrangement of the connection portions 30 may be correspondingly designed according to the specific product type of the display device and the required structural strength. For example, these connection portions 30 may be distributed on four edges, or two opposite edges, or three of the four edges of the side of the backlight module 31 adjacent to the middle casing 2, to which there is no specific limitation.

As shown in FIG. 3, in an optional embodiment of the present disclosure, the backlight module 31 is connected to the middle casing 2 via the connection portion 30. The specific construction is that, a first snap button 2a is disposed on one end of the middle casing 2 close to the side frame 1; the connection portion 30 is interposed between the side frame 1 and the end of the middle casing 2, and comprises a first snap hole 30a to be fitted with the first snap button 2a.

Figure 4:
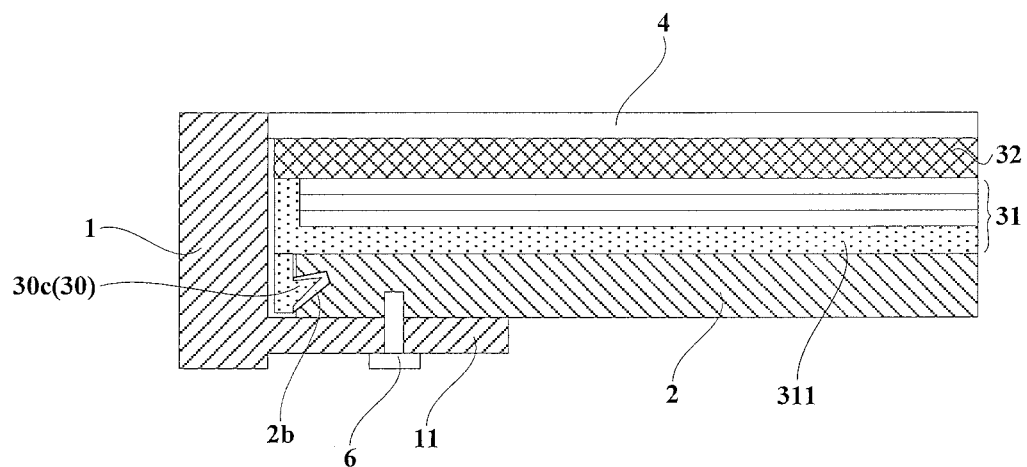
FIG. 4 is a schematic cross-sectional view of a display device according to an embodiment of the present disclosure, in which the middle casing and the connection portion are connected via the first snap groove and the first snap hook.

As shown in FIG. 4, in another optional embodiment of the present disclosure, the backlight module 31 is connected to the middle casing 2 via the connection portion 30. The specific construction is that, a first snap groove 2b is disposed on one end of the middle casing 2 close to the side frame 1; the connection portion 30 is interposed between the side frame 1 and the end of the middle casing 2, and comprises a first snap hook 30c to be fitted with the first snap groove 2b.

Figure 5:
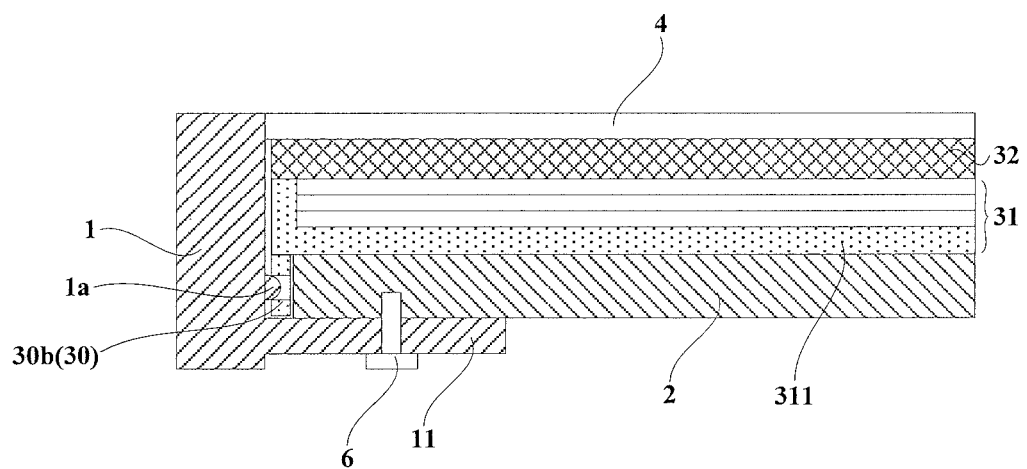
FIG. 5 is a schematic cross-sectional view of a display device according to an embodiment of the present disclosure, in which the middle casing and the connection portion are connected via a second snap button and a second snap hole.

As shown in FIG. 5, in yet another optional embodiment of the present disclosure, the backlight module 31 is connected to the side frame 1 via the connection portion 30. The specific construction is that, a second snap button 1a is disposed on a side of the side frame 1 close to the end of the middle casing 2; the connection portion 30 is interposed between the side frame 1 and the end of the middle casing 2, and comprises a second snap hole 30b to be fitted with the second snap button 1a.

Figure 6:
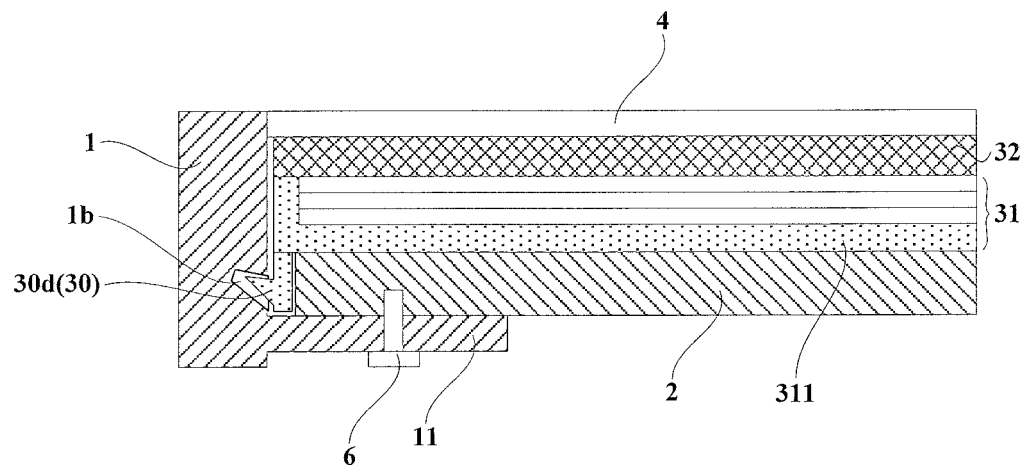
FIG. 6 is a schematic cross-sectional view of a display device according to an embodiment of the present disclosure, in which the middle casing and the connection portion are connected via the second snap groove and the second snap hook.

As shown in FIG. 6, in yet another optional embodiment of the present disclosure, the backlight module 31 is connected to the side frame 1 via the connection portion 30. The specific construction is that, a second snap groove 1b is disposed on a side of the side frame 1 close to the end of the middle casing 2; the connection portion 30 is interposed between the side frame 1 and the end of the middle casing 2, and comprises a second snap hook 30d to be fitted with the second snap groove 1b.

Figure 7:
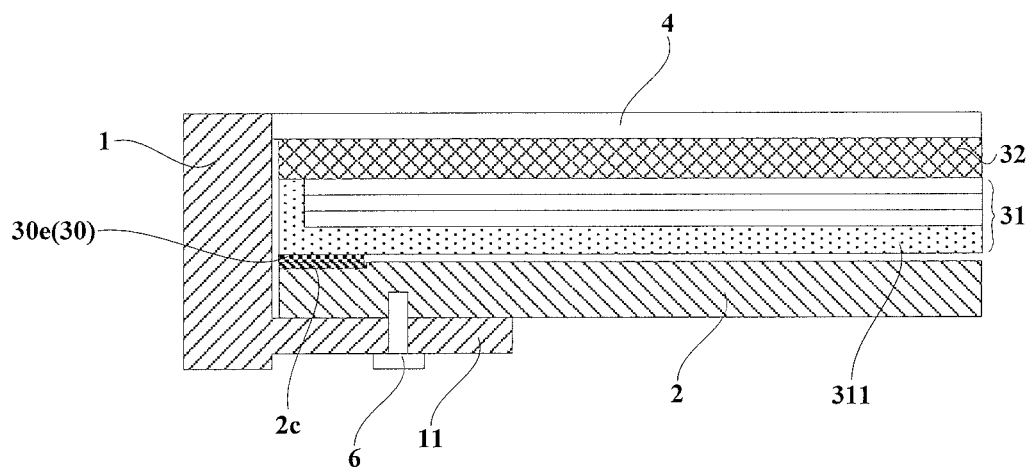
FIG. 7 is a schematic cross-sectional view of a display device according to an embodiment of the present disclosure, in which the middle casing and the connection portion are connected via the first magnetic adsorption portion and the first magnet.

As shown in FIG. 7, in an optional embodiment of the present disclosure, the backlight module 31 is connected to the middle casing 2 via the connection portion 30. The specific construction is that, a first magnetic adsorption portion 2c is disposed on a side of the middle casing 2 close to the backlight module 31; the connection portion 30 comprises a first magnet 30e to be magnetically attracted to the first magnetic adsorption portion 2c.

Figure 8:
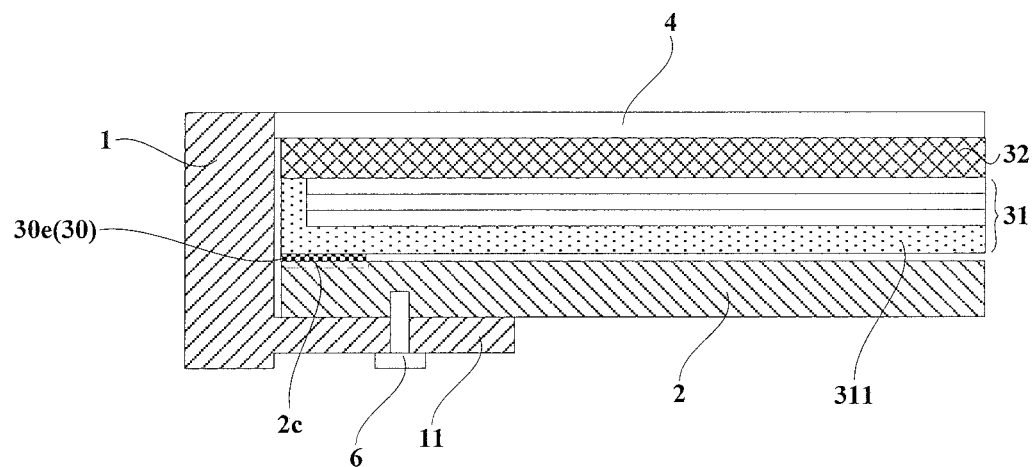
FIG. 8 is a schematic cross-sectional view of a display device according to an embodiment of the present disclosure, in which the middle casing itself has magnetic properties and is connected to the connection portion by being attracted to the first magnet.

The first magnetic adsorption portion 2c is a magnet or a magnetic adsorption metal, and may protrude from a side surface of the middle casing 2 adjacent to the backlight module 31. As shown in FIG. 7, the first magnetic adsorption portion 2c is optionally embedded in the middle casing 2 and is flush with the side surface of the middle casing 2 close to the backlight module 31, which contributes to reduce the thickness dimension of the display device. Further, as shown in FIG. 8, the middle casing 2 may be entirely made of a magnetic adsorbing material such as iron, and the first magnetic adsorption portion 2c is specifically a region of the middle casing 2 to be attracted to the first magnet 30e.

Figure 9:
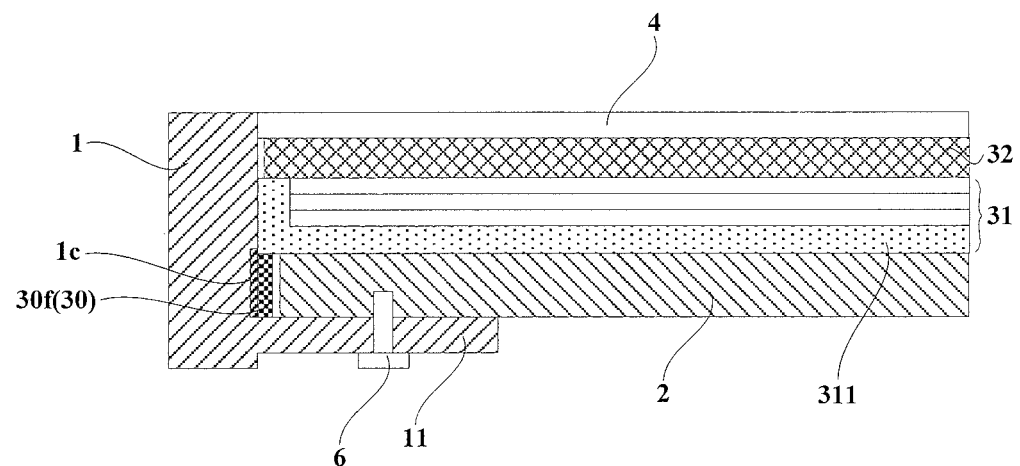
FIG. 9 is a schematic cross-sectional view of a display device according to an embodiment of the present disclosure, in which the middle casing and the connection portion are connected via the second magnetic adsorption portion and the second magnet.

As shown in FIG. 9, in another optional embodiment of the present disclosure, the backlight module 31 is connected to the side frame 1 via the connection portion 30. The specific construction is that, a second magnetic adsorption portion 1c is disposed on a side of the side frame 1 close to the end of the middle casing 2; the connection portion 30 may be interposed between the side frame 1 and the end of the middle casing 2, and comprises a second magnet 30f to be magnetically attracted to the second magnetic adsorption portion 1c.

Similarly, the second magnetic adsorption portion 1c may also be a magnet or a magnetic adsorption metal. Optionally, the second magnetic adsorption portion 1c is embedded in an inner wall of the side frame 1 and is flush with the inner wall of the side frame 1 so that it is not needed to occupy the area of the frame and the frame size of the display device may be designed to be relatively smaller. The side frame 1 may be entirely made of a magnetic adsorption material such as iron, and the second magnetic adsorption portion 1c is specifically a region of the side frame 1 to be magnetically adsorbed/attracted to the second magnet 30f.

Figure 10:
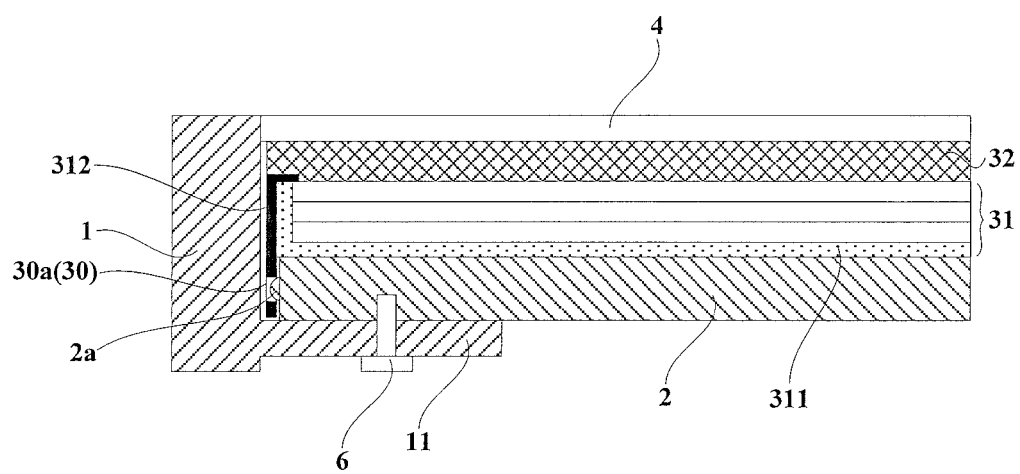
FIG. 10 is a schematic cross-sectional view of a display device according to an embodiment of the present disclosure, in which the middle casing is connected to a connection portion on the plastic frame.

As shown in FIG. 10, in an alternative embodiment of the present disclosure, the backlight module 31 further includes a plastic frame 312. The connection portion 30 is disposed on the plastic frame 312, the plastic frame 312 is connected to the back plate 311 via the connection portion 30, and the connection portion 30 may be implemented in any structural form of the foregoing embodiments. It is noted that, in the design solution of some embodiments, the structure of the backlight module may only include a plastic frame, not including the back plate, and the connection portion is disposed on the plastic frame. For example, the connection portion and the plastic frame are of a unitary structure.

The specific connection manner of the side frame 1 and the middle casing 2 is not limited, as shown in FIGS. 3-10. In these embodiment, the side frame 1 includes a fixing plate portion 11 extending to the side of the middle casing 2 away from the backlight module 31. The fixing plate portion 11 and the middle casing 2 are connected with a fastener 6, and the fastener 6 may be a conventional screw or the like. In addition, the fixing plate portion 11 of the side frame 1 and the middle casing 2 may be fixed by other means such as snap-fit.

It will be apparent to those skilled in the art that variations and modifications may be made in the present disclosure without departing from the spirit and scope of the disclosure. Thus, the present disclosure is also intended to cover such modifications and variations, if such modifications and variations are within the scope of the appended claims and their equivalents.

What is claimed is:

1. A backlight module, comprising a connection portion to be connected to a middle casing of a display device or a side frame of a display device, and the connection portion is located on a side of the backlight module facing the middle casing of the display device, wherein the backlight module further comprises a backing plate, on which the connection portion is disposed, and the connection portion and the back plate are of a unitary structure; or wherein the backlight module further comprises a plastic frame, on which the connection portion is disposed, and wherein the connection portion and the plastic frame are of a unitary structure, wherein the orthographic projection of the connection portion on a surface of one side of the display device on which the display panel is disposed falls within an effective display range.

2. The backlight module according to claim 1, wherein the backlight module comprises a plurality of connection portions which are respectively disposed on one or more edges of four edges on the side of the backlight module adjacent to the middle casing of the display device.

3. The backlight module according to claim 1, wherein the middle casing is connected to the side frame.

4. A display device, comprising a side frame and a middle casing in the side frame; and the backlight module according to claim 1, wherein the backlight module is connected to the middle casing or the side frame via the connection portion.

5. The display device according to claim 4, wherein the backlight module is connected to the middle casing via the connection portion, and a first snap button is disposed on one end of the middle casing close to the side frame; the connection portion is interposed between the side frame and the end of the middle casing and comprises a first snap hole to be fitted with the first snap button.

6. The display device according to claim 4, wherein the backlight module is connected to the side frame via the connection portion, and a second snap button is disposed on a side of the side frame close to the end of the middle casing; the connection portion is interposed between the side frame and the end of the middle casing and comprises a second snap hole to be fitted with the second snap button.

7. The display device according to claim 4, wherein the backlight module is connected to the middle casing via the connection portion, and a first snap groove is disposed on one end of the middle casing close to the side frame; the connection portion is interposed between the side frame and the end of the middle casing and comprises a first snap hook to be fitted with the first snap groove.

8. The display device according to claim 4, wherein the backlight module is connected to the side frame via the connection portion, and a second snap groove is disposed on a side of the side frame close to the end of the middle casing; the connection portion is interposed between the side frame and the end of the middle casing and comprises a second snap hook to be fitted with the second snap groove.

9. The display device according to claim 4, wherein the backlight module is connected to the middle casing via the connection portion, and a first magnetic adsorption portion is disposed on a side of the middle casing close to the backlight module; the connection portion comprises a first magnet to be attracted to the first magnetic adsorption portion.

10. The display device according to claim 4, wherein the backlight module is connected to the side frame via the connection portion, and a second magnetic adsorption portion is disposed on a side of the side frame close to the end of the middle casing; the connection portion is interposed between the side frame and the end of the middle casing and comprises a second magnet to be magnetically attracted to the second magnetic adsorption portion.

11. The display device according to claim 4, wherein the side frame includes a fixing plate portion extending to a side of the middle casing away from the backlight module, and the fixing plate portion is connected to the middle casing via a fastener.

12. The display device according to claim 4, further comprising a display panel on a side of the backlight module away from the middle casing, and a protective cover plate which is disposed on a side of the display panel away from the backlight module and is connected to the display panel.

13. The display device according to claim 12, wherein the protective cover plate extends to an inner side wall of the side frame.

14. The display device according to claim 4, wherein the middle casing is connected to the side frame.

* * * * *